Jan. 11, 1944.    P. BOILLAT    2,339,140
AUTOMATIC LATHE
Filed Oct. 24, 1940    8 Sheets-Sheet 1
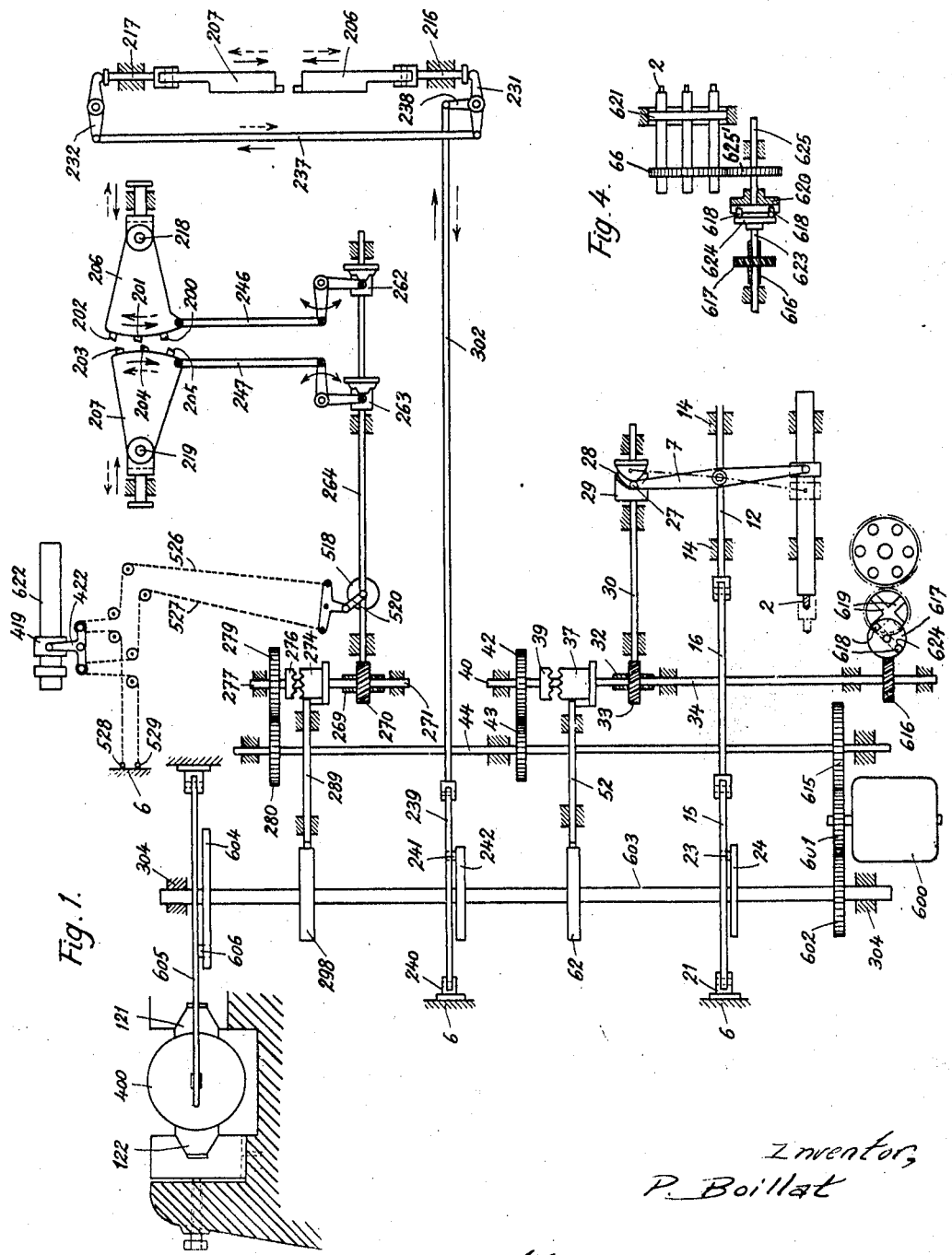

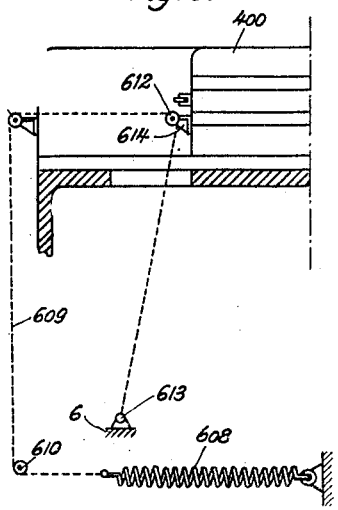
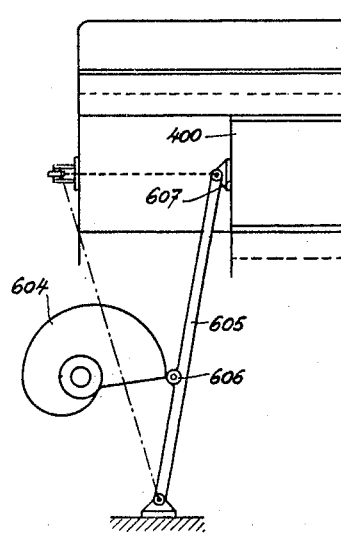

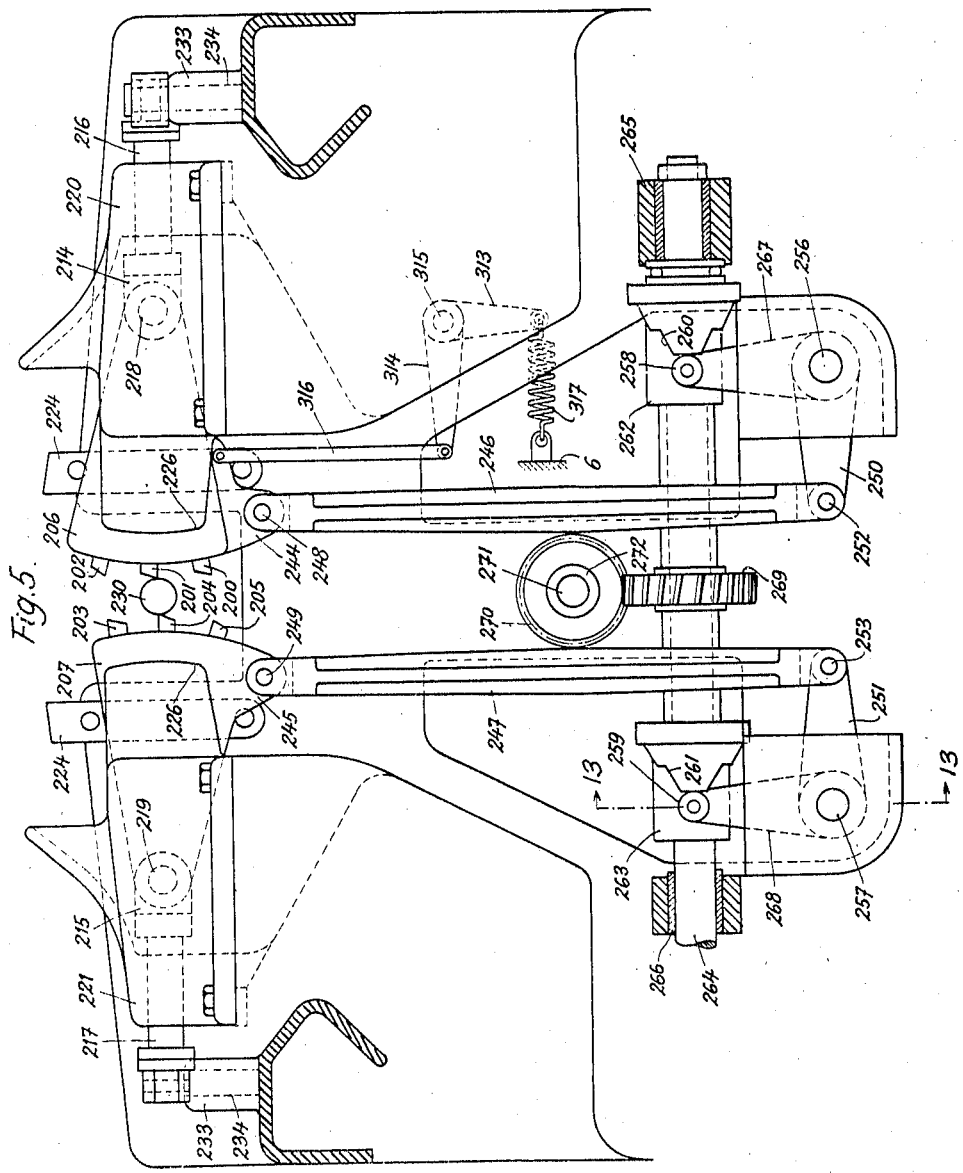

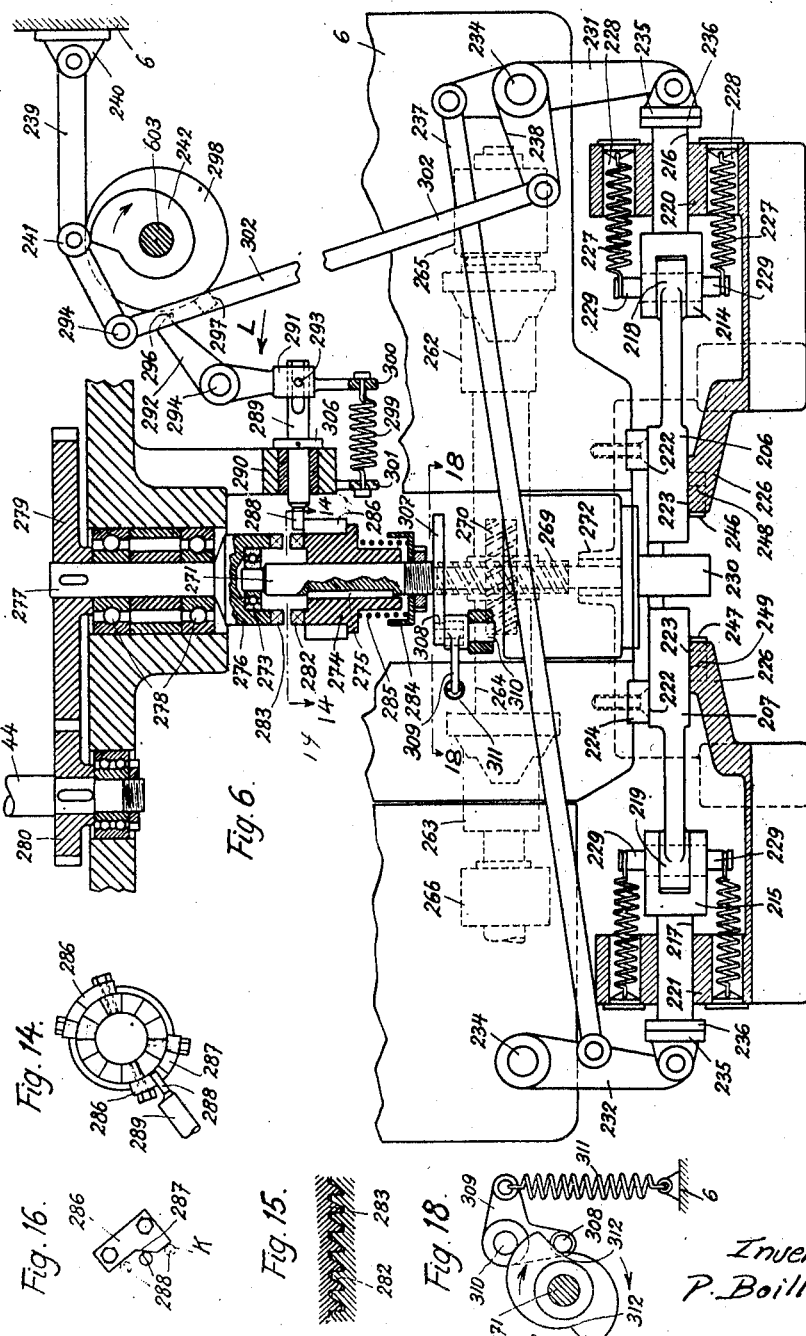

Jan. 11, 1944.   P. BOILLAT   2,339,140
AUTOMATIC LATHE
Filed Oct. 24, 1940   8 Sheets-Sheet 5

Inventor,
P. Boillat
By Glascock Downing Seebold
Attys.

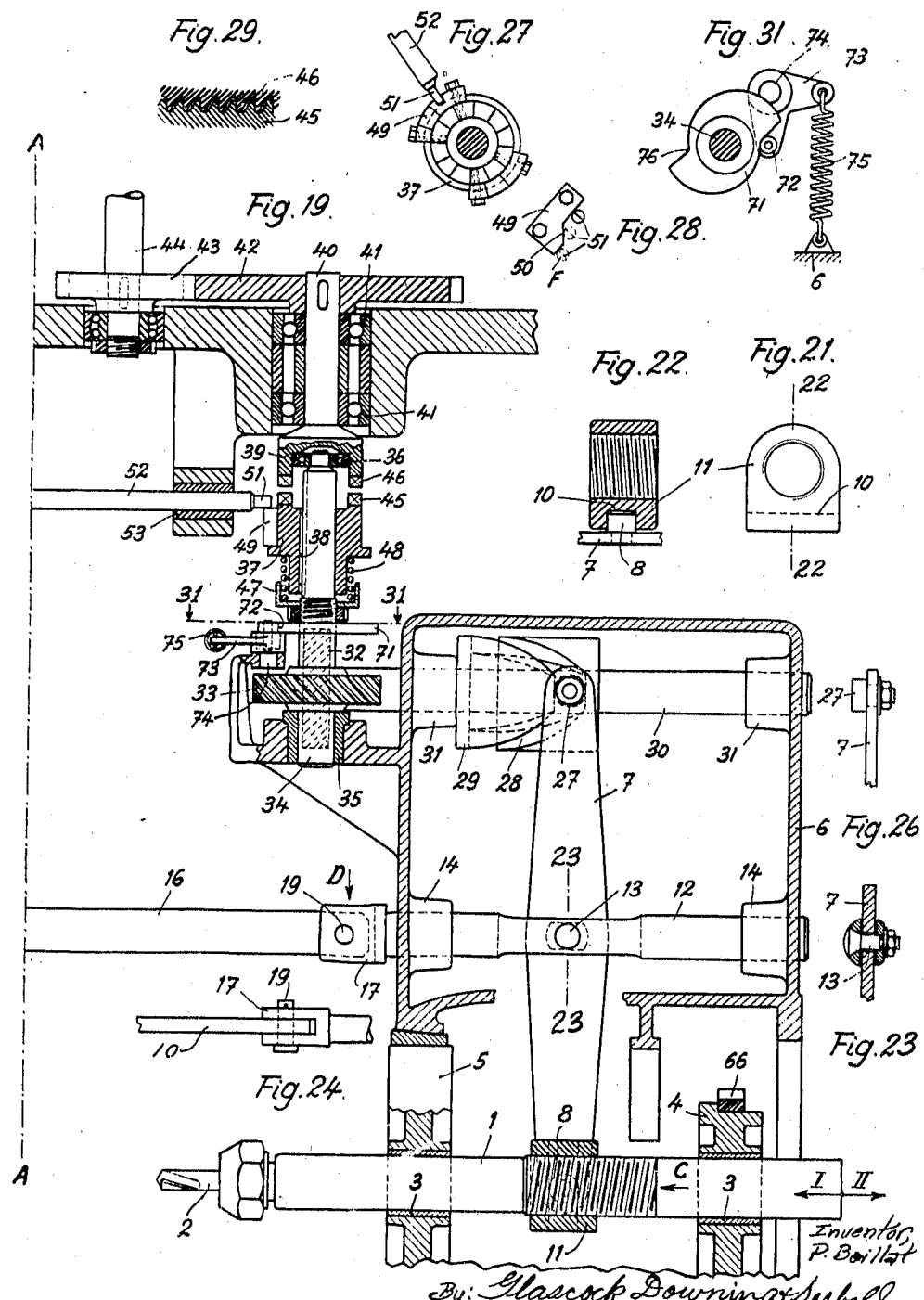

Jan. 11, 1944. P. BOILLAT 2,339,140
AUTOMATIC LATHE
Filed Oct. 24, 1940 8 Sheets-Sheet 7

Inventor,
P. Boillat
By: Glascock Downing & Seebold
Attys.

Jan. 11, 1944.  P. BOILLAT  2,339,140
AUTOMATIC LATHE
Filed Oct. 24, 1940  8 Sheets-Sheet 8
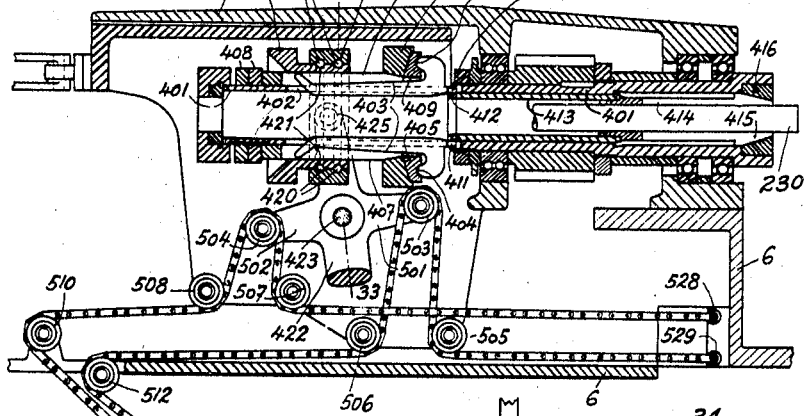
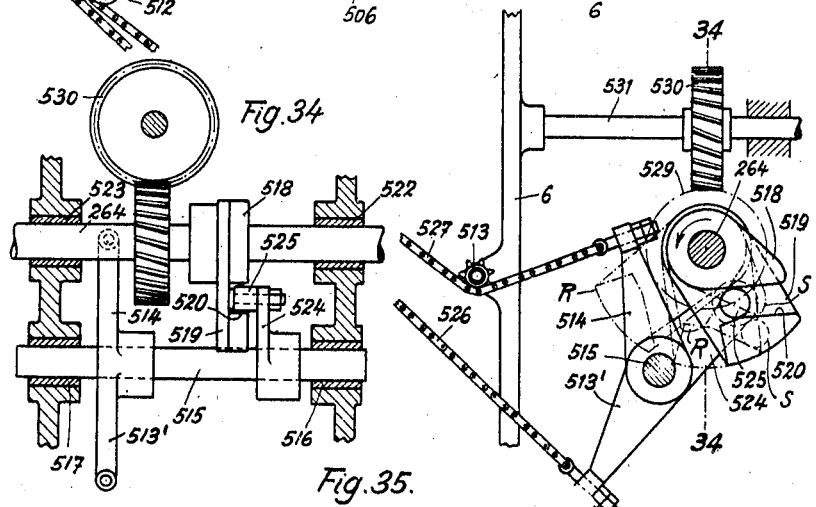
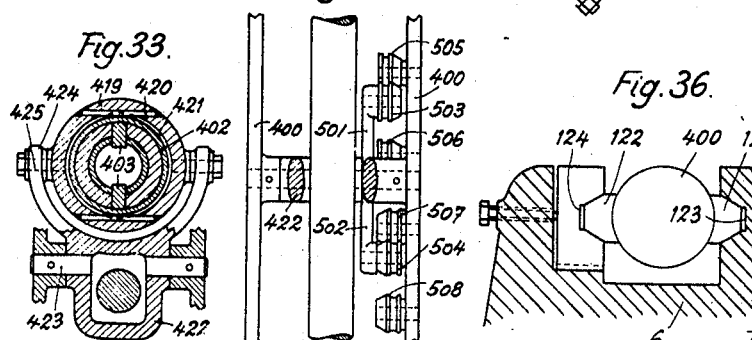
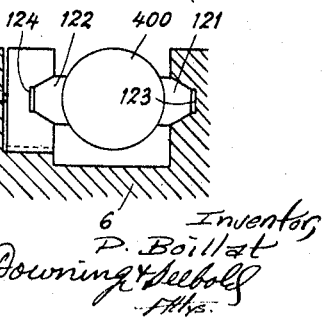

Patented Jan. 11, 1944

2,339,140

UNITED STATES PATENT OFFICE 2,339,140

AUTOMATIC LATHE

Philippe Boillat, Tavannes, Switzerland, assignor to the firm Tavannes Machines Co. S. A., Tavannes, Switzerland, a joint-stock company of Switzerland Application October 24, 1940, Serial No. 362,661 In Great Britain October 30, 1939

5 Claims. (Cl. 29—52)

This invention relates to automatic lathes.

The most important fact for the efficiency and economy of an automatic lathe is the reduction of the unproductive periods, that is, the time for withdrawing and changing the tools and the clamping and releasing of the work piece, etc.

An object of this invention is to provide a continuously rotating working camshaft driving the tools during the working periods, and intermittently driven camshafts driving the tools or their holders during the unproductive periods.

This arrangement in a preferred embodiment allows of performing the unproductive motions of the tools at a speed higher than the productive motions.

Another object is to provide disengaging clutches driving the camshaft for the unproductive motions intermittently.

A further object is to provide control-mechanisms throwing said clutches in and out of gear.

Yet another object is to operate said control mechanisms by control means mounted on the working camshaft.

Another feature is to construct disengaging clutches comprising a toothed driving and a toothed, slidably arranged driven half adapted to be pressed by a spring against the driving half and an inclined surface on the driven half and a control mechanism engaging and disengaging said inclined surface in order to push the driven half against the effect of the spring or to allow the spring to press the driven half against the driving half.

Other objects and features will be apparent as the following description proceeds reference being had to the accompanying drawings in which:

Fig. 1 is a diagrammatic arrangement of an automatic lathe. This only shows the parts necessary for the organization of the invention in a purely schematic way. Some parts such as e. g. the radially working tools and axially working tools are shown twice in this scheme, because it is impossible to show their drive for the feed motion and the tool change by the same illustration. The details for the arrangement in this figure are shown in the following figures as far as is necessary for the comprehension of the invention.

Figs. 2 and 3 are diagrammatic views, Figure 2 being a partial elevational view and Figure 3 being a partial plan view, showing the drive of the head stock.

Fig. 4 is a diagrammatic top view of the tool box and of its drive for the tool change.

Fig. 5 is a front view of the radially working tools and of their driving gear.

Fig. 6 is a top view of the device shown in Fig. 5, partly in section.

Fig. 14 is a section taken on line 14—14 of Fig. 6.

Fig. 15 is a developed projection of the teeth of the clutch shown in Figs. 6 and 14, the teeth engaging one another.

Fig. 16 shows a plate carrying an inclined surface of the disengaging clutch shown in Figs. 6, 14 and 15.

Fig. 18 is a section taken on line 18—18 of Fig. 6.

Fig. 19 is a section at the right of line A—A of a part of the mechanism for the axially working tools, showing a rocking member, a supporting member and a cylinder comprising a cam path engaging a fulcrum piece on said rocking member and a disengaging clutch adapted to drive said cylinder intermittently.

Fig. 21 is a side view of the guide member shown in the direction of arrow C in Fig 19.

Fig. 22 is a section taken on line 22—22 of Fig. 21.

Fig. 23 is a section taken on line 23—23 of Fig. 19.

Fig. 24 is a view in the direction of arrow D in Fig. 19.

Fig. 26 is a side view of a part of the rocking member shown in Fig. 19.

Fig. 27 is a front view of the driven half of the clutch shown in Fig. 19.

Fig. 28 shows a plate carrying an inclined surface of the disengaging clutch shown in Figs. 19 and 27.

Fig. 29 is a developed projection of the teeth of the clutch shown in Figs. 19, 27 and 28, the teeth engaging one another.

Fig. 31 is a section taken on line 31—31 of Fig. 19.

Fig. 32 is a vertical sectional view of the clamping mechanism for the work piece.

Fig. 33 is a vertical sectional view of the attachment of the rocking lever of the clamping device to the head stock and partly a section taken on line 33—33 of Fig. 32.

Fig. 34 is a section taken on line 34—34 of Fig. 32.

Fig. 35 is a view from above of the several rollers of the clamping device on the head stock and Fig. 36 is a schematic front view of a head stock illustrating in what manner the head stock in Fig. 32 can be slidably mounted.

Figure 7:
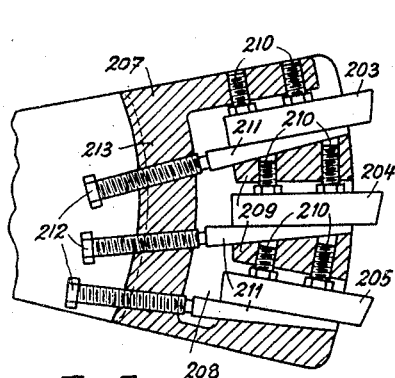
Fig. 7 is a section through one tool holder for the radially working tools.
Figure 8:
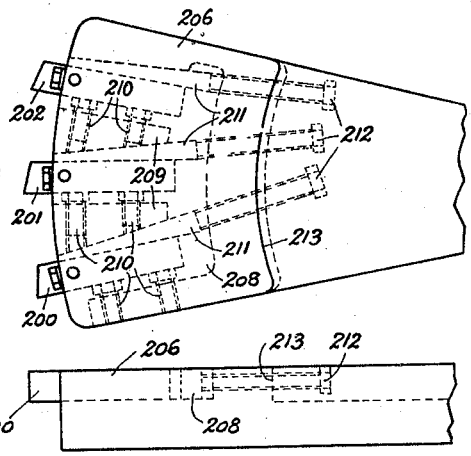
Fig. 8 is a front view of the other tool holder.
Figure 9:
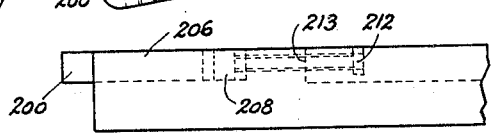
Fig. 9 is a top view of the holder shown in Fig. 8.
Figure 10:
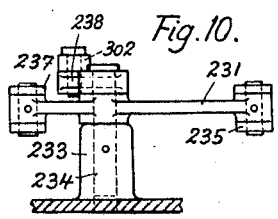
Figs. 10 and 11 are side views of the levers for imparting a feed motion to the tool holders of the radially working tools.
Figure 13:
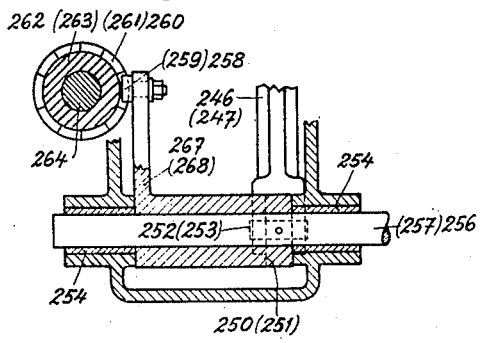
Fig. 13 is a section on line 13—13 of Fig. 5 showing parts of the drive for the tool-charging motion of one tool holder, the references in parentheses indicating the corresponding parts of the drive of the other sector.
Figure 11:
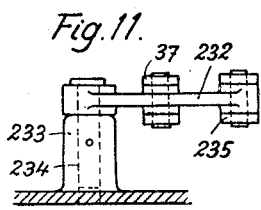
Figure 17:
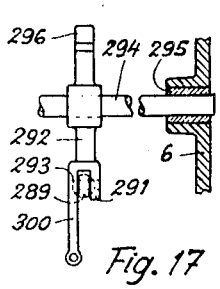
Fig. 17 shows a lever of the clutch-controlling means, seen in the direction of arrow L in Fig. 6.
Figure 12:
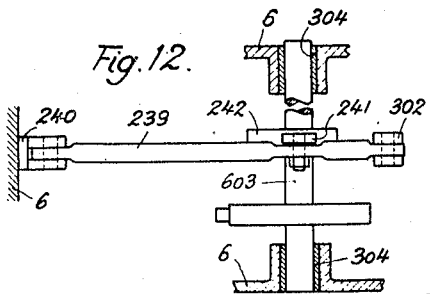
Fig. 12 is a side view of the cam disc and the lever driving the levers shown in Figs. 9 and 10.

The motor 600 drives the so-called working camshaft 603 by means of gears 601, 602 as is seen in Fig. 1. This camshaft 603 rotates at constant speed which only depends on the amount of production desired and carries all the cams for the productive periods. Cam 242 imparts a productive motion to the radially working tools 200 to 205. The means adapted to transmit the motion of cam 242 to the tools 200 to 205 is shown in greater detail in Figs. 5 to 18 and specially in my copending application Ser. No. 362,665. The rocking levers 231, 232 are pivotally mounted on bearings 233 by means of pivots 234. These levers 231, 232 have shoes 235 pivotally attached to one end of said levers and engaging corresponding shoes on the rods 216, 217 of the sectors 206, 207. The levers 231 and 232 are connected with each other by means of rod 237. On the pivot 234 of lever 231 an arm 238 is mounted. This arm is connected by means of a rod 302 with a rocking lever 239 pivotally mounted on a bracket 240 attached to the frame 6. To this lever 239 a pin 241 or a roller is fixed cooperating with the cam disc 242 mounted on shaft 603 placed on bearings 304 of the frame 6.

Figure 25:
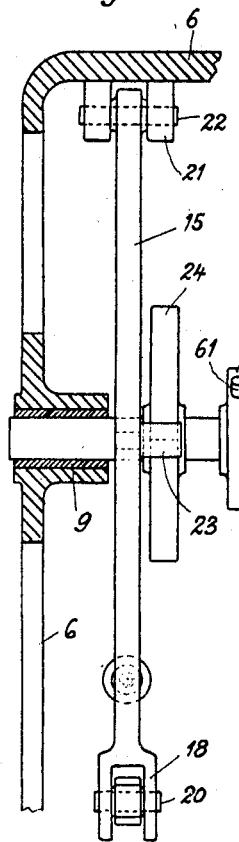
Fig. 25 is a view of the cam disc shown in Fig. 20 and of the lever cooperating with said disc.
Figure 20:
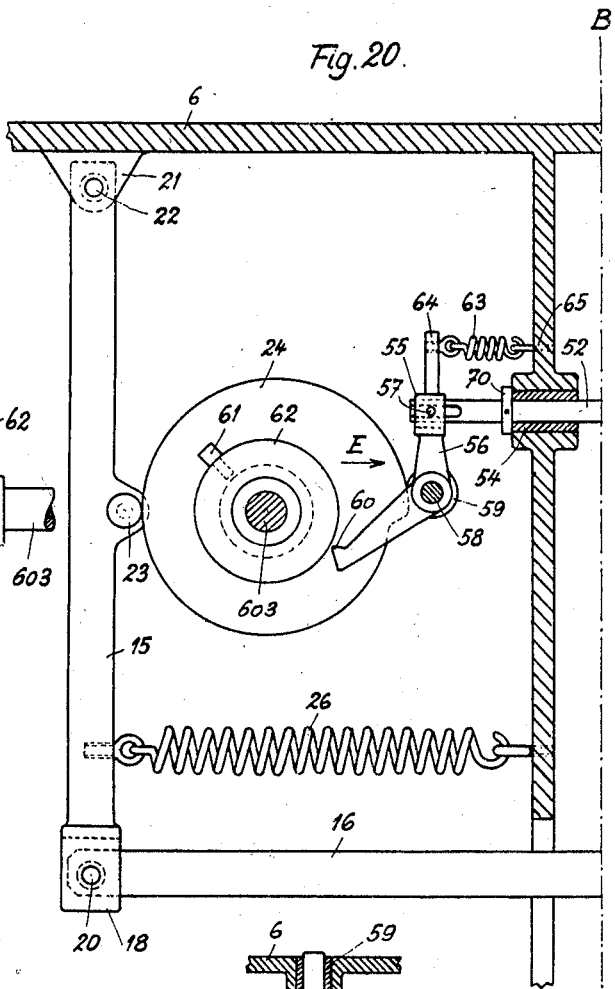
Fig. 20 is a section at the left of line B—B and complementary to Fig. 19, and showing the other elements of the mechanism, such as a continuously driven cam disc for reciprocating the supporting member carrying the rocking member, and a control means for controlling the disengaging clutch.
Figure 30:
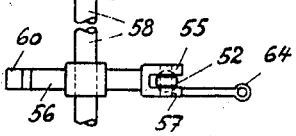
Fig. 30 shows a lever of the clutch-controlling means, seen in the direction of arrow E in Fig. 20.

Cam 24 mounted on the camshaft 603 transmits a productive motion to the axially working tool 2 with the help of a mechanism which is shown in Figs. 19 to 31 and more particularly in my copending application Ser. No. 362,664, now Patent No. 2,286,457, dated June 16, 1942. A rocking member formed as a rocking lever 7 is adapted to reciprocate the tool holder 1. For this purpose a pin 8 or a roller is provided at one end of lever 7. This pin 8 enters the groove 10 of a guide member 11 threaded to the holder 1. The lever 7 is pivotally mounted on the rod 12 by means of a bolt 13. The rod 12 is arranged with allowance for sliding on the bearings 14 fixed to the frame 6. This rod 12 is connected with a rocking lever 15 by means of a rod 16. This latter is pivotally fixed to the forked ends 17, 18 of the rod 12 and lever 15 by means of bolts 19, 20. Rocking lever 15 is pivotally mounted, e. g., on the frame 6 by means of the brackets 21 and the bolt 22. This rocking lever 15 carries a pin 23 or a roller adapted to cooperate with the cam disc 24 on the camshaft 603. A pin 27, or a roller enters the cam path 28 of the cylinder 29 secured to shaft 30 mounted on the frame 6 by means of the bearings 31.

Cam disc 604 imparts a forward motion to the head stock 400 with the help of the lever 605 cooperating with said cam disc 604 by means of the pin 606 and with the head stock 400 by means of the shoe 607. The head stock is returned by means of the spring 608 and the chain 609. This latter on the one side is fixed to the spring 608, then runs over rollers 610, 611, 612 and on the other end, is fixed to a stationary point 613. Roller 612 is mounted on a bracket 614 fixed to the head stock. The latter is guided by means of laterally arranged slide members 121, 122 forming the matter of a copending application Ser. No. 362,662, now Patent No. 2,313,613, dated March 9, 1943.

Countershaft 44 rotated by gears 691, 615 is intended to drive the shafts 264 and 30 adapted to move intermittently at such a speed that all the improductive motions are performed at a speed higher than that of the productive ones. For this purpose the shafts 277 and 40 driven by the gear wheels 280, 279 and 43, 42 respectively carry the one halves 276 and 39 of the disengaging clutches, adapted to engage the halves 274 and 37 slidably mounted on the shafts 271 and 34. Helical wheels 270, 33 on said shafts 271 and 34 engage helical wheels 269, 32 on the shafts 264 and 30.

The toothed disengaging clutches and their controlling devices are shown in Figs. 6, 14, 15, 16, 18 and 19, 27, 28, 29, 31 and are constructed as follows:

The halves 274 and 37 are slidably attached to the shafts 271 and 34 by means of the keys 275 and 38. The other halves 276 and 39 are rigidly fixed to the shafts 277 and 40 driven at a constant speed by the countershaft 44. Each half of the clutches has a toothed rim comprising teeth 282, 283 and 45, 46, the teeth of the two rims of each clutch cooperating with one another (Figs. 15 and 29) when the clutch is thrown in. Collars 284 and 47 are threaded to the shafts 271 and 34 and springs 285 and 48 are provided between the collars 284, 47 and the halves 274, 37 tending to throw the teeth 282, 283 and 45, 46, respectively, into engagement with one another by shifting the halves 274, 37 respectively. Two plates 286, 49, respectively, with inclined surfaces 287, 50 (Figs. 16 and 28) are screwed to the halves 274, 37 respectively. The upper faces of these plates comprising the surfaces 287, 50 are adapted to cooperate with the stops 288, 51 forming one end of the rods 289, 52 mounted with allowance for sliding on the bearings 290, 53, 54 respectively.

To these rods 289, 52 the forked ends 291, 55 of the rocking levers 292, 56 are pivotally fixed by means of bolts 293, 57. Levers 292, 56 are pivotally mounted on the shafts 294, 58 journaled on bearings 295, 59 of the frame 6. The other ends 296, 60 of the rocking levers 292, 56 are adapted to cooperate with drivers 297, 61 attached to the discs 298, 62 mounted on the camshaft 603. Springs 299, 63 connecting arms 300, 64 attached to levers 292, 56, respectively, with stationary points 301, 65 of the machine are provided to keep the stops 288, 51 in engaging position. In order to avoid the ends 296, 60 of the levers 292, 56 being constantly pressed against the discs 298, 62 washers 306, 70 are secured to the rods 289, 52 limiting the motion of these rods and thus of levers 292, 56. In order to stop the rotation of the shafts 264, 30, when the teeth of the clutches are disengaged, cam discs 307, 71 are fixed to the shafts 271, 34. These cam discs cooperate with pins or rollers 308, 72 attached to the one end of the rocking levers 309, 73 mounted on shafts 310, 74. Springs 311, 75 fixed to the frame 6 and to the other end of the levers 309, 73 press pins 308, 72 against the cam discs 307, 71. The hollows 312, 76 of the cam discs 307, 71 correspond to the position K, F of the stops 288, 51 shown in Figs. 16, 28. In this position the teeth are disengaged. The pressure with which pins 308, 72 are pressed into the hollows 312, 76 by means of the springs 311, 75 suffices to stop shafts 271, 34.

The operation of these clutches is as follows:

As soon as the feed motion of the tools is finished the drivers 297, 61 on the discs 298, 62 swing levers 292, 56 against the effect of springs 299, 63, each of stops 288, 51 disengages one of the plates 286, 49, respectively, so that the teeth 282, 45 of the halves 274, 37 under the effect of the springs 285, 48 engage the teeth 283, 46 of the other halves 276, 39. Shafts 30 and 264 are now rotated. When this motion has to be stopped the inclined surfaces 287, 50 (Figs. 16, 28) of the other of plates 286, 49 respectively knock against the stops 288, 51 respectively, halves 274, 37 are pushed backwards against the effect of springs 285, 48 and the teeth of the clutches are thus brought out of gear and the shafts 264 and 30 stopped by means of the stopping devices shown in Figs. 18 and 31.

When the upper clutch in Fig. 1 is thrown in, shaft 264 and with it the cylinders 262, 263 rotate. The sectors 206, 207 are rapidly swung around their pivots 218, 219 by means of the rods 246, 247 so that other tools, for instance, 200 and 205 are brought into operating position.

When the lower clutch in Fig. 1 is thrown in, shaft 30 and with it cylinder 29 is rotated in such a way that the return movement of the tool in the direction shown by arrow II (Fig. 19) is performed quicker than the feed motion so that the lost or unproductive time is reduced to the smallest amount possible.

On the shaft 264 the cam parts 518 and 520 for controlling the clamping device 622 for the work piece are also mounted. The clamping device forms the matter of a copending application Ser. No. 362,663, which is now Patent No. 2,294,017, dated August 25, 1942. In Fig. 32 the back part of the movable head stock 400 and of the spindle 401, mounted on the head stock is shown.

The cone 418 mounted on a sleeve 407 serves to contract and release the collet 414 as is described in detail in the same copending application. A ring 419 is mounted on said cone by means of pins 420 secured to the ring 419 and engaging circular grooves 421 of the cone so as to allow the cone to rotate as on a bearing. A rocking lever 422 is pivotally mounted on the head stock 400. This lever 422 is provided with two arms 501 and 502 carrying chain rollers 503, 504 respectively. Other rollers 505, 506, 507 and 508 are mounted on the head stock by means of bolts. Further chain rollers 510, 512 and 513 are pivotally fixed to the frame 6. Levers 513' and 514 are secured to a shaft 515 journaled on bearings 516, 517 (Fig. 34). To the ends of the levers 513' and 514 chains 526, 527 are attached, the one, 526, running from the lever 513 over rollers 510, 508, 504, 507 to stationary point 528 and the other, 527, from lever 514 over rollers 513, 512, 506, 503, 505 to stationary point 529. Besides cam 518 and lever 519 carrying the cam path 520 a lever 524 is fixed to the shaft 515. To this lever 524 a pin or a roller 525 is attached, adapted to cooperate alternately with the cam 518 and the cam path 520.

During one revolution of shaft 264 all those tools of the sectors 206, 207 are brought into working position by the cam paths on the cylinders 262, 263 which are necessary for manufacturing the article desired. Therefore, during one revolution of shaft 264 the collet 414 has only to be released and clamped once. This condition is fulfilled as may be seen from the following mode of operation of the clamping mechanism.

Shaft 264 with cam 518 and lever 519 rotates in an anti-clockwise direction (Fig. 32). The mutual position of cam path 520 and pin 525 shown in full lines in Fig. 32 is that in which levers 513', 514 and 524 are in their outermost left hand position. Chain 526 has then pulled lever 422 to its outermost left hand position, shown in Figure 32. Lever 422 has brought cone 418 into its extreme left hand position (Fig. 32). The collet 414 is contracted, the work piece 230 clamped. Shaft 264 on further engaging of the upper clutch (Fig. 1) goes on rotating in an anti-clockwise direction. As soon as cam 518 strikes against pin 525, which position R is indicated in dotted lines in Fig. 32, this cam begins to move lever 524, and with it levers 513', 514 in a clockwise direction. Chain 527 pulls lever 422 in a clockwise direction and cone 418 thus moves to the right; collet 414 is released. The work piece 230 may now be pushed forward by the usual means. At the end of this releasing operation cam 518 and pin 525 are in the mutual position S shown in dotted lines in Fig. 32. On further rotation of shaft 264 cam path 520 comes into cooperation with pin 525 and levers 524, 513', 514 are brought into their outermost left hand position. Pin 525 and cam path 520 are now again in the position shown in full lines in Fig. 32. Shaft 264 has made one revolution. The work piece is again clamped by the collet 414.

A helical wheel 616 is mounted on shaft 34 meshing a helical wheel 617 mounted on a shaft 623 to which an arm 624 with two pins 618 is attached (Fig. 4). The pins 618 are adapted to engage slots 619 of a Maltese cross 620 mounted on shaft 625. To this shaft a gear wheel 625' is fixed, meshing the toothed wheel 66 on the revolving tool box 621. The latter is thus rotated when the lower clutch of Fig. 1 is thrown in. This mechanism for rotating the tool box is well known to those skilled in the art and therefore, need not be described and shown in a detailed manner.

It is understood that more than two clutches could be provided. Furthermore, other tools or devices could be driven by the shafts 693, 30 and 264. To shaft 34, for instance, a cam might be secured, operating the well known pointers for locking the several positions of the tool box. A further cam could be disposed on shaft 34 controlling a tapping device of any known type.

It is understood that the drawings show the principle in a schematic way only and that the invention is not limited to the embodiment described and illustrated, as various changes may be resorted to without leaving the scope of the invention or sacrificing any of its advantages.

What I claim is:

1. In an automatic lathe, radially working tools, axially working tools, an uninterruptedly driven common camshaft comprising a cam for said radially working tools and another cam for said axially working tools, suitable motion-transmitting means adapted to transmit the motion of said first mentioned cam to said radially working tools during the productive period, other motion-transmitting means adapted to transmit the motion of said other cam to said axially working tools during the productive period, intermittently driven camshafts, and mechanisms adapted to transmit the motions of said intermittently driven camshafts to said radially and said axially working tools during the unproductive periods.

2. In an automatic lathe, radially working tools, axially working tools, a slidably mounted head stock, an uninterruptedly driven common camshaft comprising a cam for said radially working tools, another cam for said axially working tools, and a further cam for said headstock, suitable motion-transmitting means adapted to transmit the motion of said first-mentioned cam to said radially working tools during the productive period, other motion-transmitting means adapted to transmit the motion of said other cam to said axially working tools during the productive period, further motion-transmitting means adapted to be driven by said further cam and to advance said headstock, intermittently driven camshafts, and mechanisms adapted to transmit the motions of said intermittently driven camshafts to said radially and said axially working tools during the unproductive periods.

3. In an automatic lathe, radially working tools, axially working tools, an uninterruptedly driven common camshaft comprising a cam for said radially working tools and another cam for said axially working tools, suitable motion transmittingd means adapted to transmit the motion of said first mentioned cam to said radially working tools during the productive period, other motion-transmitting means adapted to transmit the motion of said other cam to said axially working tools during the productive period, other camshafts adapted to move said radially and said axially working tools during the unproductive period, disengaging clutches adapted to drive said other camshafts intermittently, control mechanisms adapted to throw said clutches in and out of gear, control means mounted on said common camshaft and adapted to operate said control mechanisms, and mechanisms adapted to transmit the motions of said other camshafts to said radially and said axially working tools during the unproductive period.

4. In an automatic lathe, radially working tools, axially working tools, an uninterruptedly driven common camshaft comprising a cam for said radially working tools and another cam for said axially working tools, suitable motion-transmittingd means adapted to transmit the motion of said first-mentioned cam to said radially working tools during the productive period, other motion-transmitting means adapted to transmit the motion of said other cam to said axially working tools during the productive period, a first intermittently driven camshaft adapted to move said radially working tools during the unproductive period, a first disengaging clutch adapted to drive said first camshaft intermittently, a first control mechanism adapted to throw said first clutch in and out of gear, a first control means mounted on said common camshaft and adapted to operate said first control mechanism, a second intermittently driven camshaft adapted to move said axially working tools during the unproductive period, a second disengaging clutch adapted to drive said second camshaft intermittently, a second control mechanism adapted to throw said second clutch in and out of gear, a second control means mounted on said common camshaft and adapted to operate said second control mechanism.

5. In an automatic lathe, a chuck-operating mechanism, radially working tools, axially working tools, a rotatable carrier carrying said axially working tools, a driving device adapted to rotate said carrier intermittently for tool change, an uninterruptedly driven common camshaft comprising a cam for said radially working tools and another cam for said axially working tools, suitable motion-transmitting means adapted to transmit the motion of said first-mentioned cam to said radially working tools during the productive period, other motion-transmitting means adapted to transmit the motion of said other cam to said axially working tools during the productive period, a first intermittently driven camshaft adapted to move said radially working tools during the unproductive period and to control said chuck-operating mechanism, a first disengaging clutch adapted to drive said first camshaft intermittently, a first control mechanism adapted to throw said first clutch in and out of gear, a first control means mounted on said common camshaft and adapted to operate said first control mechanism, a second intermittently driven camshaft adapted to move said axially working tools during the unproductive period and to operate said driving device, a second disengaging clutch adapted to drive said second camshaft intermittently, a second control mechanism adapted to throw said second clutch in and out of gear, a second control means mounted on said common camshaft and adapted to operate said second control mechanism.

PHILIPPE BOILLAT.